(No Model.) 2 Sheets—Sheet 1.
H. BURGESS.
VACUUM EVAPORATING APPARATUS.
No. 451,751. Patented May 5, 1891.
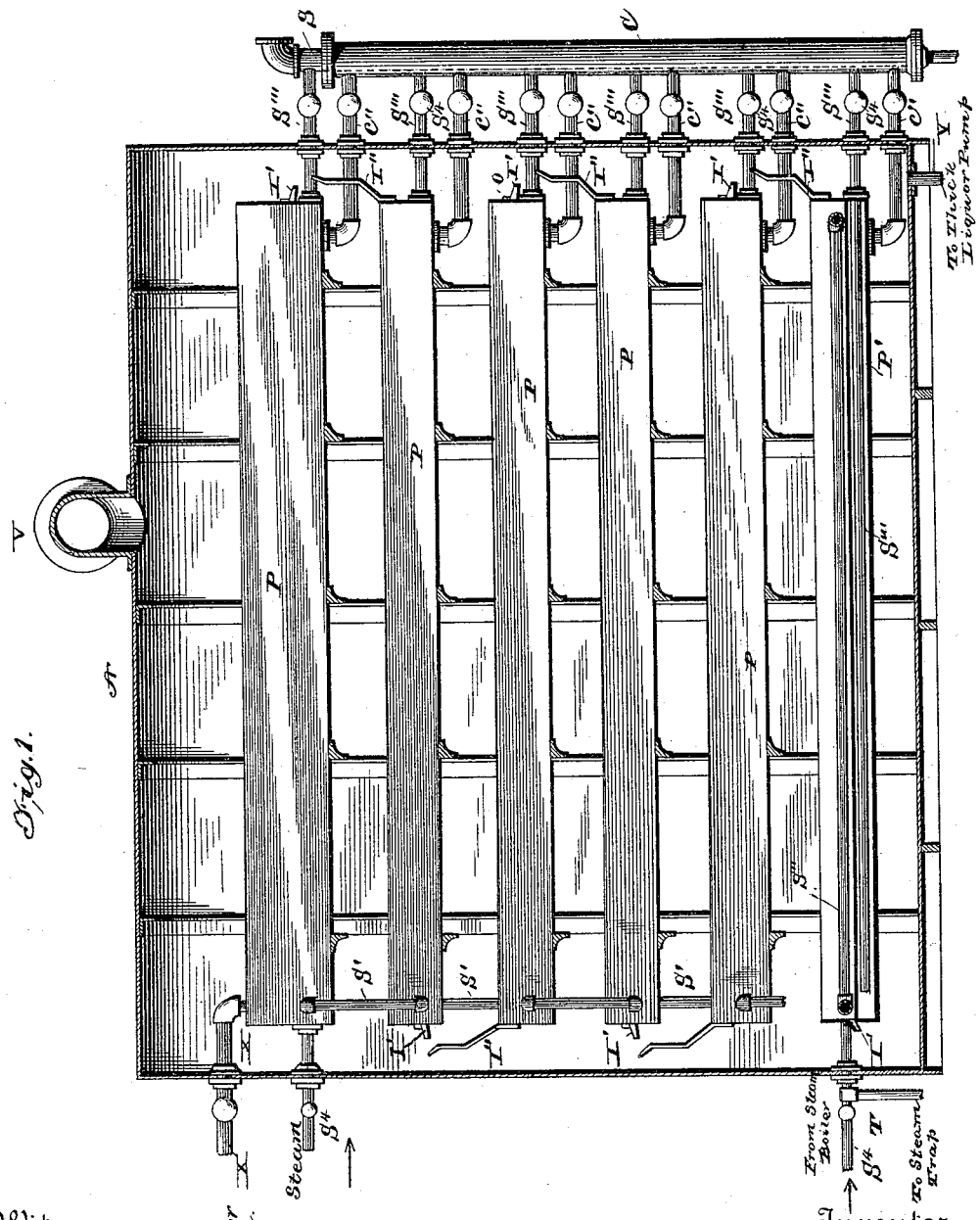

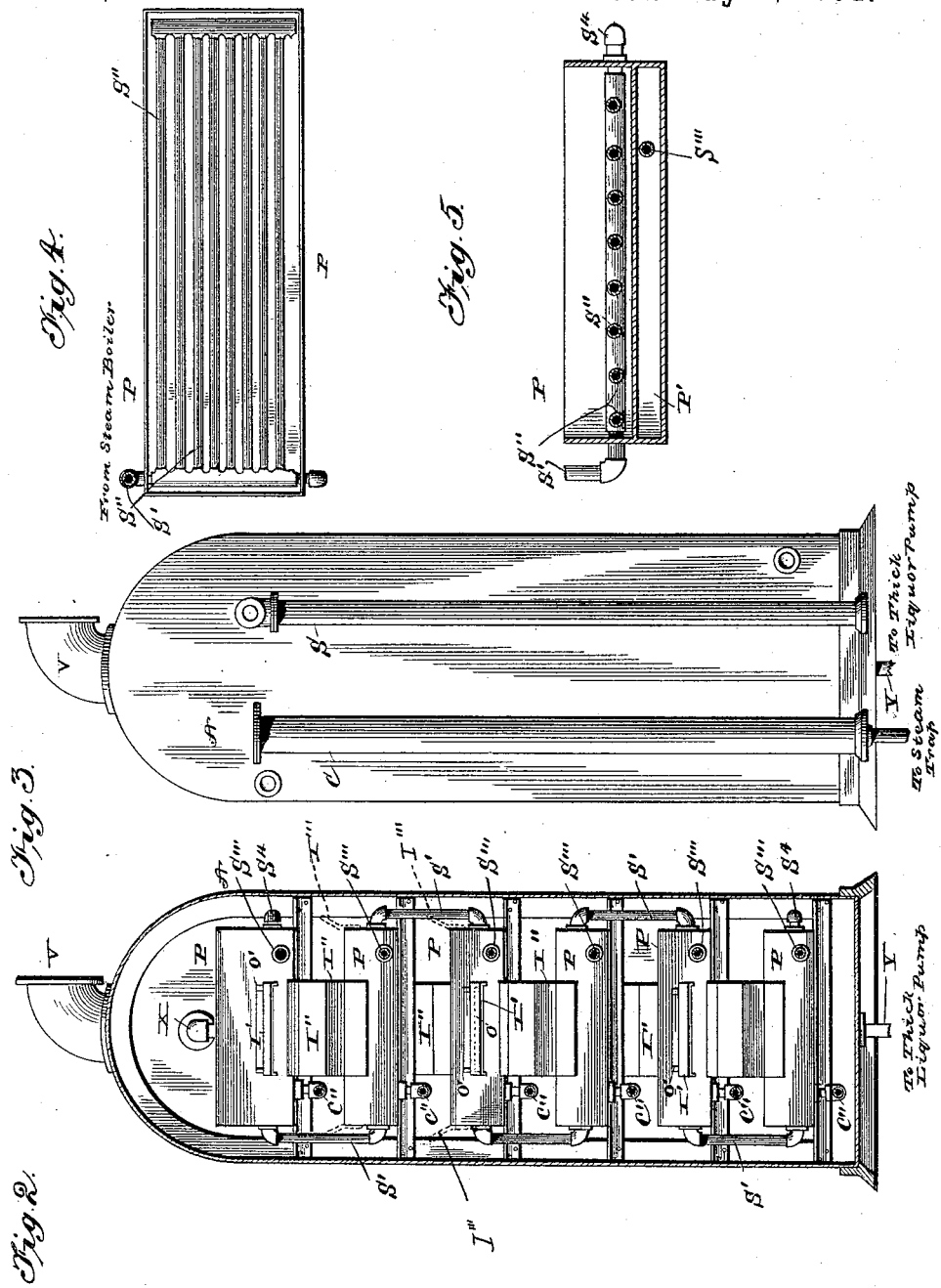

UNITED STATES PATENT OFFICE.

HUGH BURGESS, OF ROYER'S FORD, PENNSYLVANIA.

VACUUM EVAPORATING APPARATUS.

SPECIFICATION forming part of Letters Patent No. 451,751, dated May 5, 1891.

Application filed October 30, 1890. Serial No. 369,827. (No model.)

*To all whom it may concern:*

Be it known that I, HUGH BURGESS, a subject of the Queen of Great Britain, residing at Royer's Ford, in the county of Montgomery and State of Pennsylvania, have invented certain new and useful Improvements in Vacuum Evaporating Apparatus, of which the following is a specification, reference being had therein to the accompanying drawings.

Referring to the accompanying drawings, Figure 1 represents a vertical sectional view of my apparatus complete, all the pans being shown in side elevation except the lowest one; Fig. 2, a vertical sectional view thereof, the inclosed pans being shown in end elevations; Fig. 3, an end elevation; Fig. 4, a detail plan view of one of the pans, and Fig. 5 a transverse sectional view of the same.

The invention has particular reference to that class of vaporizing apparatus wherein a series of horizontal evaporating-pans are supported, one above the other, in a vacuum-chamber, the liquor to be vaporized being fed in a continuous regulated stream into one end of the uppermost pan and caused to flow in a thin sheet over the steam-heated bottom of the same, the liquor escaping vaporization in the upper pan being discharged from the opposite end thereof into the adjacent end of the pan next below and caused to flow in the opposite direction over the heated bottom of the latter, and so on through the whole series of pans, the liquor passing or flowing over the highly-heated bottoms of the pans alternately in opposite directions until the residuum is finally discharged through an outlet in the bottom of the vacuum-chamber, the highly-heated vapor generated being drawn off from the top of the apparatus, as will more fully hereinafter appear.

The special object of the present invention is to provide the apparatus with simple means whereby the vapor produced will not only be heated to a much higher temperature, but will also be materially increased in quantity without increasing the size and the material cost of the apparatus, as will presently appear.

Referring to the drawings by letter, A designates the outer metallic casing, which is of any suitable shape, and which is suitably braced interiorly with angle-irons. Communicating with the upper part of the casing is a vapor-outlet V, and leading out of the bottom is a liquor-outlet Y. Supported one above the other upon transverse angle-irons within the casing is a series of horizontal shallow pans P, each of which is provided with a steam space or chamber P' under its entire bottom, steam being supplied to the chambers by means of horizontal pipes S''', extending approximately the full length thereof. These steam-supply pipes are extended out through the ends of the pans and the end of the casing and are connected to a vertical supply-pipe S, regulating-cocks S⁴ being placed in these pipes between the vertical pipe and the casing to regulate the amount of steam admitted to the pans. The condensed steam from the chambers P' is conducted off by a series of valved pipes c'', which pass out through one end of the casing and communicate with a vertical column C, the lower end of which is connected to a steam-trap in the usual manner.

The liquor to be vaporized is fed in a regulated stream to one end of the upper pan by means of a valved pipe X, and the opposite end of this pan is provided with a discharge-opening o and a discharge spout or lip I', whereby the unevaporated liquor may be discharged into the adjacent end of the next pan below, the end of this latter pan being provided with an upwardly-extending plate or lip I'' to receive the liquor discharged from the said spout I'. The opposite end of this second pan is also provided with a discharge-opening and lip or spout, whereby the liquor may be discharged into the next lower pan, and so on down through all the pans, each pan being provided with a discharge-opening and spout and an upwardly-extending receiving-lip I''.

Supported above the bottom of each pan, but in close proximity thereto, is a horizontal steam or hot-air coil S'', the longitudinal pipes thereof being separated from each other a suitable distance and having communication with each other. These coils are connected together by vertical pipes S', and the uppermost and lowermost coils are connected by means of valved steam-pipes S⁴ directly to a steam-boiler or to a steam or hot-air superheater, so that all the coils may be kept constantly supplied with live steam or superheated air. The water of condensation from these coils, if steam is used, is conducted off by means of a pipe T, connected to the lower pipe S⁴, and having its lower end sealed by a steam-trap in the ordinary way.

As shown in Fig. 2 at I''', the upper side edges of the pans may be provided with outwardly-flaring flanges, if desired, to catch any liquid that may drip from the upper pans.

Slides or gates o' may be placed at the discharge-opening of the pans to regulate the flow of liquid therefrom.

Operation: A vacuum is first established in the casing in the usual manner. Steam is then let into the false bottoms of the pans in suitable volume, and superheated steam in considerable pressure is admitted to the coils in the pans, after which the liquor to be vaporized is introduced into the upper pan in suitable quantities. The quantity of liquor introduced into the upper pan should be sufficient to cause it to flow evenly in a thin sheet or film over the bottoms of the pans, the depth of liquor in each of the pans being regulated by the slides or gates at the discharge-openings thereof. The unevaporated liquor from the first or uppermost pan is discharged into the next lower or second pan, and is then caused to flow in the opposite direction to the discharge-opening of this latter pan, and so on alternately in opposite directions until it is finally discharged from the lowest pan into the bottom of the casing, from whence it is conducted off by the pipe Y in the usual manner.

The liquor in passing over the bottoms of the pans in thin sheets is thereby subjected to the heat from the steam-chambers below and to the heat radiated down upon its surface from the horizontal steam-coils above. Thus subjecting the liquor in thin sheets to heat both from above and below insures a material increase in the amount of vapor evaporated. By separating the pipes of the coil, so as to permit the vapor to circulate freely around, and between them the efficiency of the apparatus is further increased. The foam produced by the violent ebullition of the liquid rises through and around the pipes, and is thereby broken up and thrown back, and whatever liquid is deposited upon the pipes is rapidly evaporated. Another action of the coils is to heat the vapor rising from the liquor undergoing evaporation in the pans above the boiling-point of this liquor *in vacuo*. Thus if the boiling-point of a liquid *in vacuo* is, because of the reduction of the atmospheric pressure, say 130°, the heat from the coils can raise this vapor temperature up to 160°, or 30° above its boiling-point, and consequently when that heated vapor is used in the steam-space of the next "effect" of the apparatus its heating effect in the steam-space in that effect is increased proportionally.

I am aware that it is not new to support in a vacuum a vertical series of inclined evaporating-pans provided with false heating-bottoms and so arranged that the liquid to be evaporated is fed into the uppermost pan and caused to flow alternately back and forth over their heated bottoms, and I am also aware that it is not new to arrange a submerged coil near the bottom of a pan having a steam-heating chamber below its bottom. I do not, therefore, broadly claim such features as my invention.

Having thus fully described my invention, what I claim, and desire to secure by Letters Patent, is—

1. The combination, with an evaporating-pan provided with a heating-chamber under its bottom, of a superheating-surface arranged above and in close proximity to the liquid-line of the pan, and means for heating the said surface above the temperature of the chamber under the pan, whereby the liquid in the pan will be subjected to the action of heated surfaces both from above and below, as and for the purpose described.

2. The combination, with an evaporating-pan provided with a heating-chamber below its bottom and means for maintaining the liquid being evaporated at a certain level, of an open superheating-coil supported above and in close proximity to the surface of the liquid and means for heating this coil above the temperature of the chamber under the pan, whereby the rising generated vapor will be superheated and the foam broken and thrown back and the quantity of vapor materially increased, substantially as described.

3. The combination, with a vacuum-chamber, a pan located therein and provided with a false bottom and means for maintaining the liquid in the pan at a certain level, of a horizontal open superheating-coil supported above and in close proximity to the liquid-level and means for heating this coil above the temperature of the chamber under the pan, whereby the foam will be broken and thrown back and the liquid subjected to heat both above and below and the generated vapor superheated as it rises through the coil, substantially as described.

4. The combination, in a vacuum-evaporating apparatus, of a vacuum-chamber, a series of pans supported one above the other in said chamber and provided with false heating-bottoms, inlet and outlet pipes connected to these false bottoms, means for feeding the liquid to be evaporated to the said pans and maintaining it at a certain level therein, a superheating-coil arranged in each pan above and in close proximity to the surface of the liquid therein, means for heating the coils above the temperature of the chambers under the pans, for the purpose herein set forth, and pipes connecting these coils together and to a source of heat, substantially as set forth.

In testimony whereof I affix my signature in presence of two witnesses.

HUGH BURGESS.

Witnesses:
   I. HAZLETON MIRKIL,
   HORACE M. RUMSEY.